United States Patent
Gillner et al.

[11] Patent Number: 5,378,305
[45] Date of Patent: Jan. 3, 1995

[54] DEVICE FOR LAYING A THIN METAL WIRE IN A STRAIGHT LINE ON THE SURFACE OF THE THERMOPLASTIC FILM OF A LAMINATED GLASS PANE

[75] Inventors: Manfred Gillner, Aachen; Siegfried Pikhard, Roetgen; Emilio Sancho; Karl-Heinz Muller, both of Aachen; Luc Vanaschen, Eupen, all of Germany; Matilde H. Sanchez, legal representative of said Emilio Sancho, deceased

[73] Assignee: Saint-Gobain Vitrage International, Courbevoie, France

[21] Appl. No.: 4,542

[22] Filed: Jan. 14, 1993

[30] Foreign Application Priority Data

Jan. 22, 1992 [DE] Germany ............... 4201620

[51] Int. Cl.[6] ............................. B32B 31/00
[52] U.S. Cl. ........................... 156/574; 156/166; 156/176; 156/436
[58] Field of Search .............. 156/103, 166, 176, 436, 156/574; 242/75, 75.1, 75.4, 75.41, 75.42, 25 R, 25 A, 150 R; 188/161, 163, 171

[56] References Cited
U.S. PATENT DOCUMENTS

| | | | |
|---|---|---|---|
| 3,206,138 | 9/1965 | Lindsey | 242/150 R |
| 3,673,044 | 6/1972 | Miller et al. | 156/391 X |
| 3,761,030 | 9/1973 | Leinonen et al. | 242/25 A |
| 4,946,523 | 8/1990 | Meussner | 156/103 X |
| 5,023,420 | 6/1991 | Aso et al. | 219/69.12 |

*Primary Examiner*—David A. Simmons
*Assistant Examiner*—James J. Engel
*Attorney, Agent, or Firm*—Oblon, Spivak, McClelland, Maier, & Neustadt

[57] ABSTRACT

A device for laying a thin metal wire in a straight line on the surface of the thermoplastic film of a laminated glass pane. A rotatable mounting is provided for the wire supply reel, a heated pressing roller presses the wire into the thermoplastic film and a guide device guides the wire between the supply reel and the pressing roller. The supply reel is coupled in rotation to an electromagnetic brake having an adjustable braking torque and a wide control range for the braking torque. The electromagnetic brake is preferably a magnetic powder brake.

6 Claims, 3 Drawing Sheets

DEVICE FOR LAYING A THIN METAL WIRE IN A STRAIGHT LINE ON THE SURFACE OF THE THERMOPLASTIC FILM OF A LAMINATED GLASS PANE

BACKGROUND OF THE INVENTION

1. Field of the Invention

This invention relates to a device for laying a thin metal wire in a straight line on the surface of the thermoplastic film of a laminated glass pane, the device comprising a rotatable mounting for the wire supply reel, a heated pressing roller for pressing the wire into the thermoplastic film and guide device for the wire between the supply reel and the pressing roller.

2. Description of the Related Art

A device of this kind is known, for example, from DE 20 43 706 B2. In this case, the wire laid into the plastic intermediate film of a laminated glass pane is intended to serve as an antenna wire, but a laying device of this construction is also suitable for laying thin metal wires which serve other purposes. For example, resistance wires for the manufacture of heated glass panes can be laid with such a laying device, as can metal wires which serve solely for decorative purposes.

The metal wires commonly used in the manufacture of heatable laminated glass panes are extremely thin. As a rule, wires of tungsten having a diameter of about 20 micrometers are used for this purpose. It is very difficult to lay such thin wires by means of the conventional device in an absolutely rectilinear array. In particular, it has been found that the mechanical behavior of the wires to be laid is not always constant, but that the wires frequently possess elastic stresses which can lead to uncontrolled deformations in the laying of the wire. Deviations of the wires from the straight line are found to be particularly annoying to the human eye when the wires are laid at a comparatively small spacing in a parallel arrangement, which occurs, for example, in the case of electrically heatable laminated glass panes.

SUMMARY OF THE INVENTION

An object of the present invention is to create a device of the aforementioned kind which is capable of laying thin metal wires in a rectilinear form with high reproducibility and reliability in operation.

The device of this invention is characterized by an electromagnetic brake having an adjustable torque, acting upon the wire reel. Due to the arrangement of an electromagnetic brake having an adjustable braking torque, a defined pre-stress acting in the direction of the wire length is deliberately given to the wire at the instant of its fixing onto the film surface, the level of this pre-stress being adapted to the wire thickness and the wire quality in each case. The optimum level of the pre-stress and the braking force corresponding to it can be rapidly determined for each wire by a few tests and the braking force, having once been set, can be maintained unchanged for that particular quality of wire, the other conditions remaining unaltered.

Basically, electromagnetic brakes of any type are suitable for the purpose according to this invention, provided they can be adjusted by fine steps and have a wide control range, in particular brakes having the basic construction of an electric motor comprising a stationary inductor part and a rotor influenced by magnetic induction. The control range for the torque or braking torque should preferably cover a range of about 1:50.

The type of brakes known as magnetic powder brakes have proved to be particularly suitable. Magnetic powder brakes comprise a rotor and a primary element disposed around the rotor and comprising a toroidal coil which is supplied with direct current. In the air gap between the rotor and the primary element, there is a magnetizable powder. As a result of the magnetization when the current is switched on, the powder grains form a kind of chain, the stiffness of this chain varying with the magnetic field and being directly proportional to the value of the applied current. In this manner, a very uniform braking torque acting upon the rotor is obtained, the value of which is directly proportional to the current supplied to the primary part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
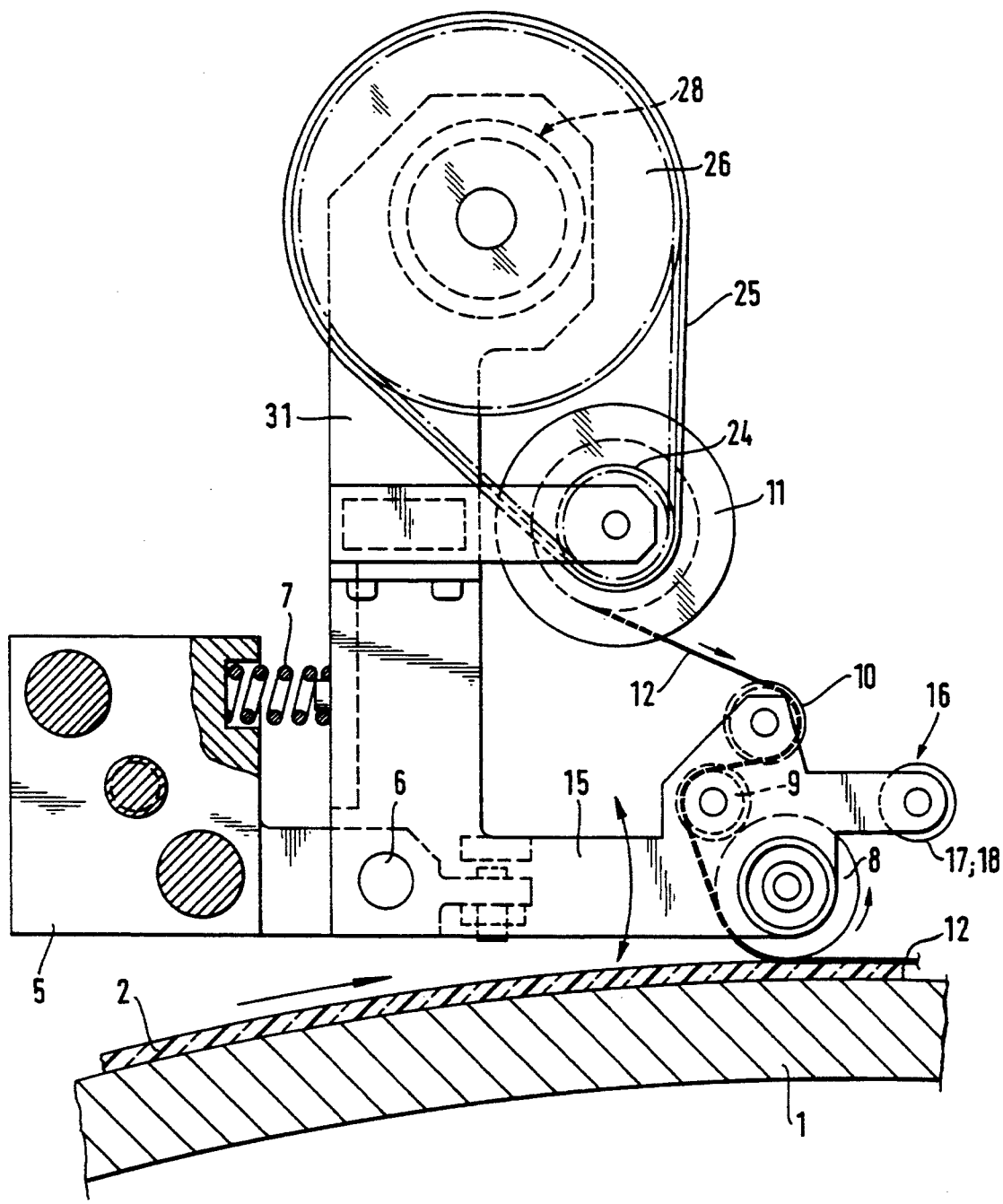
FIG. 1 is a lateral view of the wire laying device.
Figure 2:
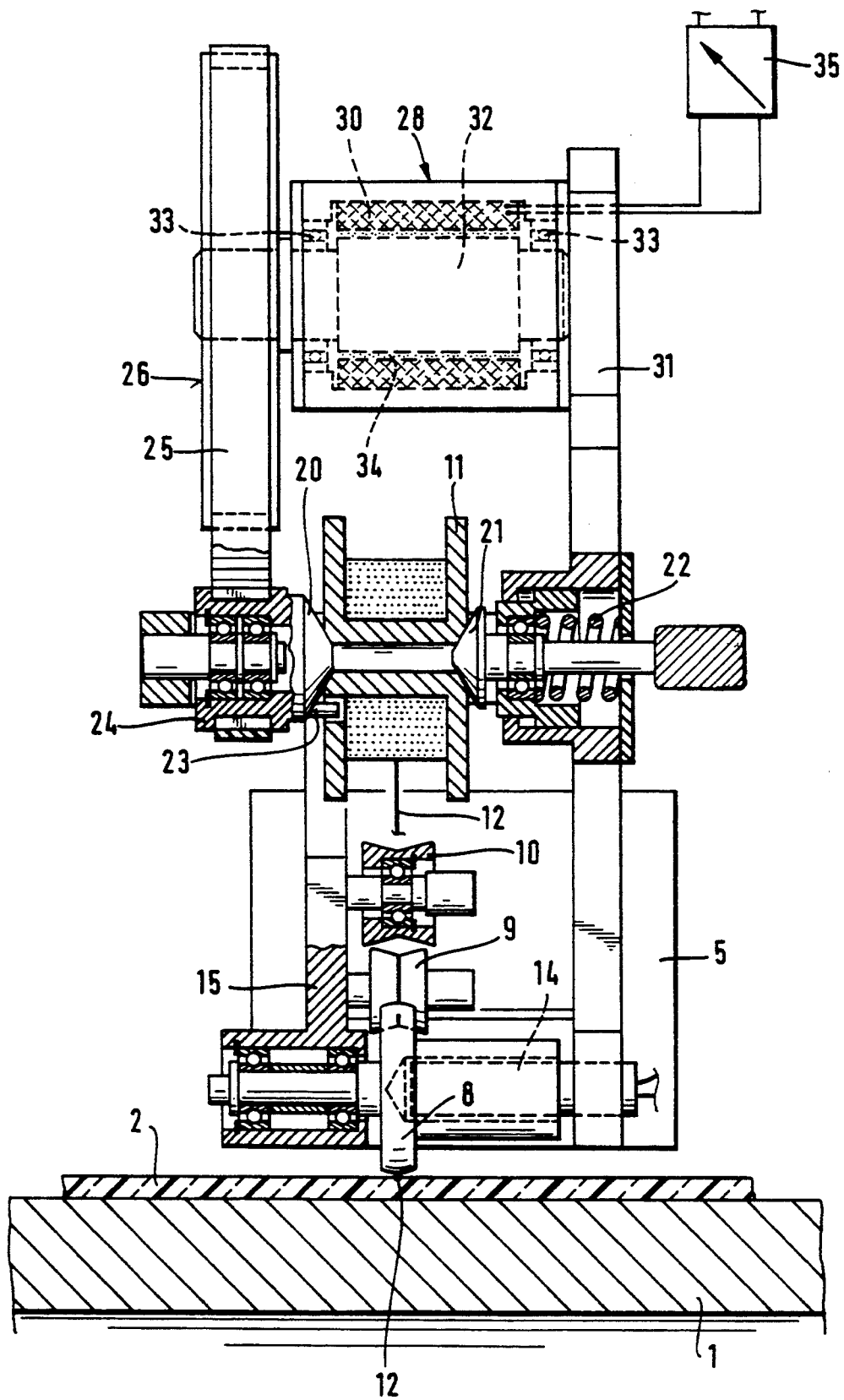
FIG. 2 is a front elevation.
Figure 3:
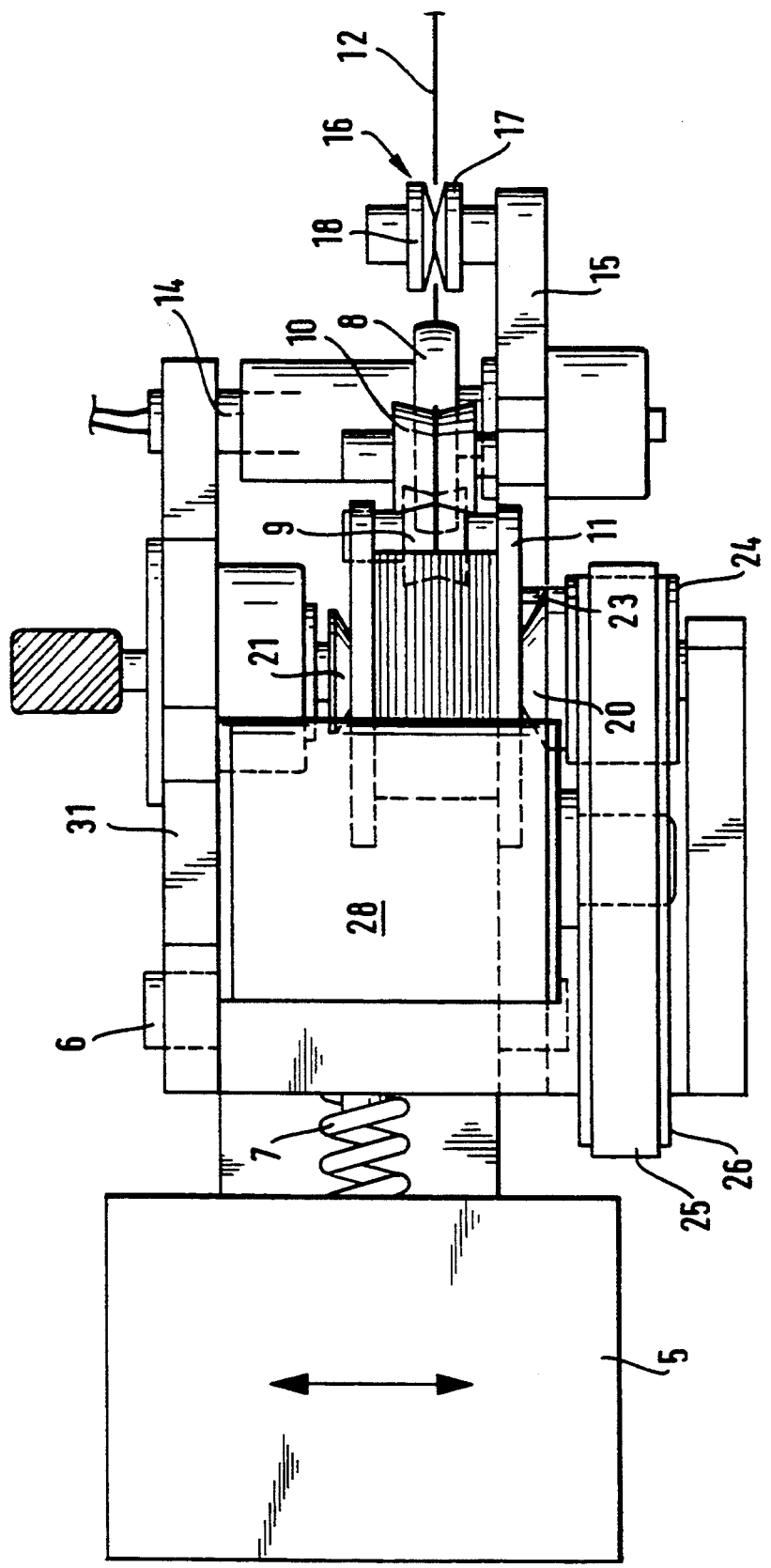
FIG. 3 is the device in plan.

The wire laying device according to this invention is 1.5 arranged above a movable support surface 1 for the thermoplastic film 2, which in particular may be a film or sheet of polyvinyl butyral, as is commonly used in the production of laminated glass panes. The support surface may advantageously be constructed as a cylindrical drum of large diameter, on the cylinder wall of which the film is held by suction. While the drum revolves, the wire laying device is moved by a spindle drive in a direction parallel to the drum axis. In this way, the wire is laid in a parallel arrangement having a uniform spacing on the surface of the film.

On the mounting 5, which is slowly driven by means of the spindle drive in the direction parallel to the drum axis, the arm 15 of the laying device is pivotally journaled about a pivot axis 6, and in its working position is pressed onto the drum 1 by a spring 7 which bears against the mounting 5, the pressing roller 8 rolling along the surface of the film 2.

The wire laying device comprises, in addition to the pressing roller 8, two wire guide rollers 9 and 10, and also a mounting for the wire supply reel 11. The wire 12, coming from the supply reel 11, is guided and fed to the desired angle to the pressing roller 8 by the wire guide rollers 9 and 10, and is so guided by them in the horizontal direction that it is always fed to the exact center of the pressing roller 8. In order to fulfill this guiding function, both the upper guide roller 10 and also the lower guide roller 9 are each formed as a double-cone, so that the wire always adopts the central position on the two guide rollers under the action of the wire tension.

The pressing roller 8 has a bulging or convex pressing surface, so that the wire 12 runs along the apex line of this convex surface. In this manner, the wire 12 is pressed into the surface of the film 2 without the lateral edges of the pressing roller 8 penetrating into the film 2. The electrical heating cartridge 14, which is also mounted on the arm 15 of the laying device, ensures that the pressing roller 8 is heated to the required temperature.

In front of the pressing roller 8 and above it is disposed a wire catching roller 16 which consists of two freely journaled discs 17, 18, which are pressed towards each other under the action of a spring, not shown, so that in the at-rest position of the laying device the wire 12 can be clamped between the two discs 17, 18.

The mounting for the supply reel 11 comprises two tapered spindles 20, 21, rotatably journaled by ball bearings, of which the spindle 21 is journaled slidably in its axial direction. It is pressed by a helical spring 22 against the reel body. The spindle 20, disposed on the opposite side, is provided with an eccentrically disposed entraining pin 23, which fits into a corresponding lateral bore in the side wall of the supply reel and ensures a firm coupling between the spindle 20 and the supply reel. In addition, the spindle 20 is equipped with a toothed belt wheel 24, which cooperates with a toothed belt 25. The toothed belt 25 cooperates, at the other end, with a toothed belt wheel 26, which is coupled to the rotor of a magnetic powder brake 28.

The hollow cylindrical primary component 30 of the magnetic powder brake is fixed to the mounting arm 31 of the laying device in an appropriate manner. In the primary component 30, the rotor 32 is journaled by ball bearings 33. The toothed belt wheel 26 is connected to the rotor 32. The transmission of the desired braking torque from the primary component 30 to the rotor 32 takes place in the manner described earlier by electromagnetic induction, by which the magnetic powder 34, present in the air gap between primary component 30 and rotor 32, achieves a more or less strong bonding coupling.

This braking torque, exerted by the magnetic powder brake, can be sensitively adjusted by regulating the excitation current to the brake by means of the controller 35, in a wide control range of about 1:50. The braking torque set, the value of which is adapted to the particular wire used and to the other production conditions such as speed of laying, processing temperature, etc., is maintained highly constant by the magnetic powder brake.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Device for laying a thin metal wire from a wire supply reel in a straight line on the surface of a thermoplastic film of a laminated glass pane, comprising:
   a rotatable mounting for a wire supply reel;
   a heated pressing roller having a convex pressing surface for pressing wire from the supply reel into the thermoplastic film;
   a guide device for guiding the wire between the supply reel and the pressing roller; and
   an electromagnetic brake having an adjustable braking torque operatively connected to the supply reel so as to brake the rotation thereof,
   wherein said guide device comprises two rollers, each of said rollers constructed in the form of a double cone.

2. Device according to claim 1, wherein the electromagnetic brake has a braking torque control range of about 1:50.

3. Device according to claim 1, wherein the electromagnetic brake is a magnetic powder brake.

4. Device according to claim 1, wherein the electromagnetic brake is disposed above the rotatable mounting, including a toothed belt for transmitting the braking torque of the electromagnetic brake to the rotatable mounting.

5. Device according to claim 1 including a wire catching roller comprising two discs pressed together by spring force, wherein in an at-rest state of the device the wire is held between the discs, the wire catching roller being positioned above the pressing roller.

6. Device according to claim 1, wherein the guide device and pressing roller are mounted on an arm pivotally journaled about a pivot bearing, including a spring pressing the arm so that the pressing roller is pressed onto the thermoplastic film on which the wire is to be laid.

* * * * *